US011620486B2

(12) United States Patent
Katz et al.

(10) Patent No.: US 11,620,486 B2
(45) Date of Patent: Apr. 4, 2023

(54) ESTIMATING AND VISUALIZING COLLABORATION TO FACILITATE AUTOMATED PLAN GENERATION

(71) Applicant: International Business Machines Corporation, Armonk, NY (US)

(72) Inventors: Michael Katz, Elmsford, NY (US); Biplav Srivastava, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1373 days.

(21) Appl. No.: 15/843,194

(22) Filed: Dec. 15, 2017

(65) Prior Publication Data
US 2019/0188551 A1   Jun. 20, 2019

(51) Int. Cl.
G06N 3/00 (2006.01)
G06N 5/02 (2006.01)
G06N 3/006 (2023.01)

(52) U.S. Cl.
CPC .............. *G06N 3/006* (2013.01); *G06N 5/02* (2013.01)

(58) Field of Classification Search
CPC ...... G06Q 10/06; G06Q 10/10; G06Q 50/188; G09B 29/10; G09B 7/04; G06N 3/006; G06N 5/02; G06N 7/005; G06N 5/003; G06N 20/10; G06N 5/04; G06N 20/00; G06F 9/4446
USPC .......................................................... 706/11
See application file for complete search history.

(56) References Cited

U.S. PATENT DOCUMENTS

| | | | | |
|---|---|---|---|---|
| 5,940,816 A | * | 8/1999 | Fuhrer | .................... G06N 20/00 706/13 |
| 7,360,201 B2 | * | 4/2008 | Srivastava | ............. G06Q 10/06 717/101 |
| 7,454,399 B2 | | 11/2008 | Matichuk | |
| 7,617,230 B2 | | 11/2009 | Srivastava | |

(Continued)

FOREIGN PATENT DOCUMENTS

EP           0405876 A2     1/1991

OTHER PUBLICATIONS

Agarwal et al., "Understanding Approaches for Web Service Composition and Execution," COMPUTE '08 Proceedings of the 1st Bangalore Annual Compute Conference, 2008, ACM, 8 pages. http://dl.acm.org/citation.cfm?id=1341773.

(Continued)

*Primary Examiner* — Viker A Lamardo
(74) *Attorney, Agent, or Firm* — Amin, Turocy & Watson, LLP

(57) ABSTRACT

Techniques facilitating estimating and visualizing entity to agent collaboration to facilitate automated plan generation are provided. In one example, a computer-implemented method comprises generating, by a device operatively coupled to a processor, a plan based on receiving first input data associated with an instance model. The computer-implemented method also comprises generating, by the device, a revised plan based on receiving second input data, associated with a revised instance model, from an entity. Furthermore, the computer-implemented method comprises, tracking, by the device, a contribution of the entity as a function of a modification from the instance model to the revised instance model.

20 Claims, 10 Drawing Sheets

(56) References Cited

U.S. PATENT DOCUMENTS

| | | | |
|---|---|---|---|
| 8,473,447 | B2 | 6/2013 | Yoon et al. |
| 8,677,262 | B2* | 3/2014 | Baier ................. G05B 19/0426 715/772 |
| 9,135,053 | B2 | 9/2015 | Goodwin et al. |
| 9,639,353 | B1* | 5/2017 | Henriksen ............... G06F 9/451 |
| 2002/0046060 | A1* | 4/2002 | Hoskyns ................ G16H 20/60 705/2 |
| 2004/0093296 | A1* | 5/2004 | Phelan ................... G06Q 30/02 705/36 R |
| 2007/0043607 | A1* | 2/2007 | Howard ................. G09B 29/10 705/1.1 |
| 2009/0006166 | A1 | 1/2009 | Do |
| 2009/0030861 | A1 | 1/2009 | Almond |
| 2009/0086021 | A1* | 4/2009 | Baier ...................... H04N 7/18 348/143 |
| 2009/0088875 | A1* | 4/2009 | Baier ............... G05B 19/41865 700/83 |
| 2009/0088883 | A1* | 4/2009 | Baier ...................... G06T 7/001 700/110 |
| 2009/0089225 | A1* | 4/2009 | Baier ..................... G06Q 10/06 706/12 |
| 2009/0089682 | A1* | 4/2009 | Baier ..................... G06Q 10/10 715/751 |
| 2009/0089709 | A1* | 4/2009 | Baier ................... G05B 19/409 715/817 |
| 2014/0279800 | A1 | 9/2014 | Anastasopoulos |
| 2014/0282359 | A1 | 9/2014 | Feblowitz et al. |
| 2015/0339580 | A1 | 11/2015 | Riabov et al. |
| 2015/0339582 | A1 | 11/2015 | Riabov et al. |
| 2016/0117602 | A1 | 4/2016 | Hassanzadeh et al. |
| 2017/0075859 | A1 | 3/2017 | Bnayahu et al. |
| 2017/0147923 | A1 | 5/2017 | Riabov et al. |

OTHER PUBLICATIONS

Belhajjame et al., "PROV-O: The PROV Ontology," WC3, 68 pages. Retrieved on Oct. 27, 2017. https://www.w3.org/TR/prov-o/.

Fox et al., "PDDL2.1: An Extension to PDDL for Expressing Temporal Planning Domains," Journal of Artificial Intelligence Research (JAIR), 2003, pp. 61-124, vol. 20, AI Access Foundation and Morgan Kaufmann Publishers, 64 pages.

Pohl, "Heuristic Search Viewed as Path Finding in a Graph," Artificial Intelligence 1, 1970, pp. 193-204, American Elsevier Publishing Company, Inc., 12 pages.

Helmert et al., "Landmarks, Critical Paths and Abstractions: What's the Difference Anyway?" Proceedings of the Nineteenth International Conference on Automated Planning and Scheduling, 2009, pp. 162-169. Association for the Advancement of Artificial Intelligence, 8 pages.

Helmert et al., "Flexible Abstraction Heuristics for Optimal Sequential Planning," Proceedings of the Seventeenth International Conference on Automated Planning and Scheduling, 2007, pp. 176-183, Association for the Advancement of Artificial Intelligence, 8 pages.

Haslum et al., "Domain-Independent Construction of Pattern Database Heuristics for Cost-Optimal Planning," Proceedings of the Twenty-Second AAAI Conference on Artificial Intelligence, 2007, pp. 1007-1012, Association for the Advancement of Artificial Intelligence, 6 pages.

Domshlak et al., "Enhanced Symmetry Breaking in Cost-Optimal Planning as Forward Search," Proceedings of the Twenty-Second International Conference on Automated Planning and Scheduling, 2012, pp. 343-347, Association for the Advancement of Artificial Intelligence, 5 pages.

Wehrle et al., "About Partial Order Reduction in Planning and Computer Aided Verification," Proceedings of the Twenty-Second International Conference on Automated Planning and Scheduling, 2012, pp. 297-305, Association for the Advancement of Artificial Intelligence, 9 pages.

Nareyek et al., "Constraints and AI Planning," IEEE Intelligent Systems, 2005, pp. 62-72, IEEE Computer Society, 11 pages.

Ghallab et al., "PDDL—The Planning Domain Definition Language," Version 1.2, Oct. 1998, 27 pages. Retrieved on Oct. 31, 2017 http://homepages.inf.ed.ac.uk/mfourman/tools/propplan/pddl.pdf.

Manikonda et al., "Learning Personalized Actionable Domain Models," Unpublished U.S. Appl. No. 15/475,551, filed Mar. 31, 2017, International Business Machines Corporation, 59 pages.

Manikonda et al., Autonomous Learning of Actionable Models From Unstrutured Data, Unpublished U.S. Appl. No. 15/420,433, filed Jan. 31, 2017, International Business Machines Corporation, 40 pages.

* cited by examiner

ESTIMATING AND VISUALIZING COLLABORATION TO FACILITATE AUTOMATED PLAN GENERATION

BACKGROUND

The subject disclosure relates to automated plan generation, and more specifically, to estimating and visualizing collaboration between an entity and an agent to facilitate automated plan generation.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate estimating and visualizing collaboration to facilitate automated plan generation are described.

According to an embodiment, a system can comprise a memory that stores computer executable components, and a processor that executes the computer executable components stored in the memory. The computer executable components of the system can comprise a planner component that, generates a plan based on receiving first input data associated with an instance model, and generates a revised plan based on receiving second input data, associated with a revised instance model, from an entity. The computer executable components of the system can also comprise a tracker component that, tracks a contribution of the entity as a function of a modification from the instance model to the revised instance model.

According to another embodiment, a computer program product that facilitates automated plan generation can comprise a computer readable storage medium having program instructions embodied therewith. The program instructions can be executable by a processor and the processor can generate a plan based on receiving first input data associated with an instance model. The program instructions can also be executable to generate a revised plan based on receiving second input data, associated with a revised instance model, from an entity. Additionally, the program instructions can also be executable track a contribution of the entity as a function of a modification from the instance model to the revised instance model.

According to yet another embodiment, a computer-implemented method is provided. The computer-implemented method can comprise generating, by a device operatively coupled to a processor, a plan based on receiving first input data associated with an instance model. The computer-implemented method can also comprise, generating, by the device, a revised plan based on receiving second input data, associated with a revised instance model, from an entity. Furthermore, the computer-implemented method can also comprise, tracking, by the device, a contribution of the entity as a function of a modification from the instance model to the revised instance model.

In some embodiments, one or more of the above elements described in connection with the systems, computer-implemented methods and/or computer program programs can be embodied in different forms such as a computer-implemented method, a computer program product, or a system.

DETAILED DESCRIPTION

Figure 1:
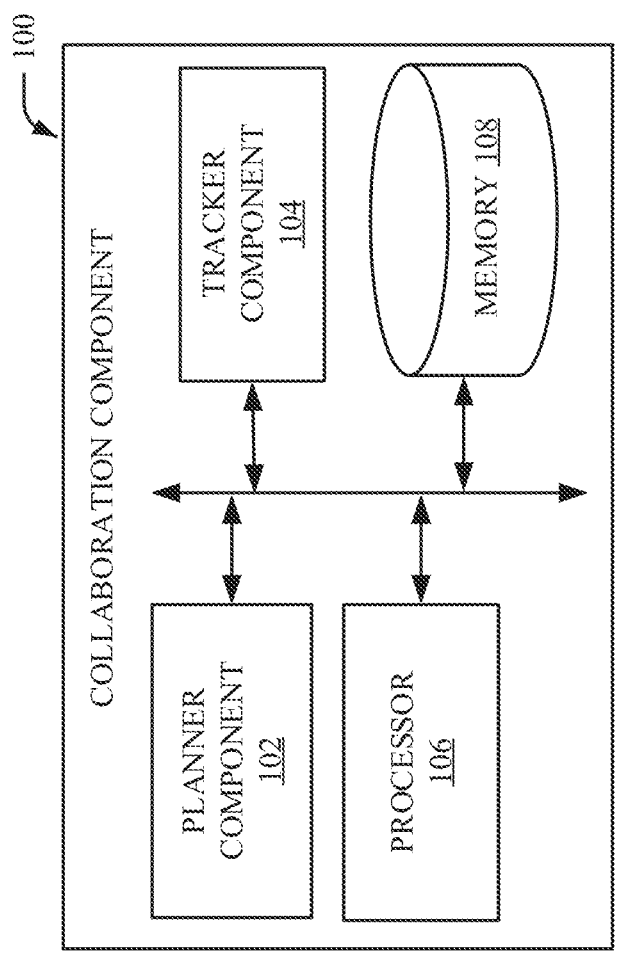
FIG. 1 illustrates a block diagram of an example, non-limiting collaboration component that facilitates estimating and visualizing collaboration to facilitate automated plan generation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Automated planning is a field of artificial intelligence that aims at finding plans, which when executed, achieve a particular goal. An automated decision maker (e.g., planner) and an entity can collaborate to find a solution to a problem, via planning, in a series of iterations. A planning problem can comprise three variables <I, G, A>, in which I is the complete description of the initial state, G is the partial description of the goal state, and A is the set of executable (primitive) actions. Various optimization criteria can be used to (e.g., number of steps in the plan, etc.) to generate and allocate plans. A planner can search the space of all possible actions to find a plan to efficiently achieve the goal. In a simple example, an entity can build a minimum correct model, a planner agent can solve N problems in a domain to generate a plan according to that model, and a contribution of the entity and the planner agent can be determined in relation to their respective contributions to the plan. Some planning languages work with one single model and do not separate into domain and problem models. The planner can be configured to accept input specifications via a single model or in a planning domain definition language (PDDL) format in two parts. The actions (A) of the input are called the "domain model", and the remaining initial (I) and goals states (G) part are called the "problem model". An "instance model" can encompass both the domain model and the problem model. Both the domain model and the problem model can be modified and/or revised. Consequently, a revised instance model can mean a change in the domain model, the problem model, or both the domain model and the problem model.

An artificial intelligence (AI) agent can generate and allocate plans, that when executed, achieve a particular goal. An automated planning system architecture can receive an input, which comprises a problem and/or a domain description (e.g., A: actions) and problem description (e.g., I: initial state and G: goal state). A planner component of the system architecture can communicate with the entity to assist in solving the problem. The planner can generate plans: (a) from scratch without any intervention from an external entity, (b) by accessing a previously stored plan and using it as the basis to generate a new plan without intervention from the external entity, (c) taking guidance from the external entity including change in the domain model and planner's internal parameter settings, or (d) any combination of the above. Once the problem is solved, the system architecture can output the plan to another entity via an endpoint device. Additionally, if the planning system receives a revised input (e.g., revised domain model), the planning system can generate a revised plan.

One or more embodiments described herein can estimate and visualize collaboration to facilitate automated plan generation. One or more embodiments described herein can also include systems, computer-implemented methods, apparatuses, and computer program products that facilitate estimating and visualizing collaboration to facilitate automated plan generation.

FIG. 1 illustrates a block diagram of an example, non-limiting collaboration component that facilitates estimating and visualizing collaboration to facilitate automated plan generation in accordance with one or more embodiments described herein.

In various embodiments, the collaboration component 100 can be associated with or included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system or the like.

In one embodiment, the collaboration component 100 can perform estimating and visualizing entity to agent collaboration to facilitate automated plan generation. The collaboration component 100 can comprise several subcomponents including, but not limited to a planner component 102 and a tracker component 104, processor 106, and memory 108 that can bi-directionally communicate with each other. It should also be noted that in alternative embodiments that other components including, but not limited to the sub-components, processor 106, and/or memory 108, can be external to the collaboration component 100.

Aspects of the processor 106 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the collaboration component 100. In an aspect, the collaboration component 100 can also include memory 108 that stores computer executable components and instructions.

The collaboration component 100 can be employed to use hardware and/or software to solve problems that are highly technical in nature (e.g., automated planning, configuration modification, dynamic state modification, mitigating multiple domain problems simultaneously, etc.), that are not abstract and that cannot be performed as a set of mental acts by a human due to the processing capabilities needed to facilitate estimating and visualizing entity to agent collaboration to facilitate automated plan generation, for example. Further, some of the processes performed may be performed by a specialized computer for carrying out defined tasks related to memory operations. For example, a specialized computer can be employed to carry out tasks related to estimating and visualizing entity to agent collaboration to facilitate automated plan generation or the like.

In the embodiment shown in FIG. 1, the collaboration component 100 can comprise one or more subcomponents (e.g., planner component 102, tracker component 104), which can be electrically and/or communicatively coupled to one another in various embodiments. As shown in FIG. 1, the subcomponents can be communicatively coupled to the memory 108 and the processor 106. The collaboration component 100 can determine how to transition from one configuration to another configuration (e.g., from a first state to a second state) to achieve a particular goal. A state is a collection of facts with the semantics that information corresponding to predicates (e.g., a logical construct) in the state holds. The collaboration component 100 can be configured to determine the relationship between the contribution of an entity (e.g., a person, artificial intelligence (AI), device, etc.) and the contribution of a planner (e.g., software program, hardware, robot, AI, etc.) while solving a problem. For example, the planner component 102 can receive problem data indicative of a problem to be solved such as, "What is the most efficient way to transition from one configuration to another configuration?" In response to receiving the problem data, the planner component 102 can generate a plan for the problem in accordance with a domain model associated with the problem. The domain model can comprise a set of requirements that the planner component 102 shall abide by whilst generating the plan to address the problem. Consequently, if the planner component 102 receives a revised domain model, then the planner component 102 can adjust the plan based on one or more different requirements associated with the revised domain model.

Additionally, a plan generation can be linear, wherein a plan is generated, and then the plan is executed. However, in alternative embodiments, the plan can be interleaved with the execution. For example, a subset of the plan can be generated, then the subset can be executed, then another subset of the plan can be generated, and then the other subset of the plan can be executed. The aforementioned embodiments can also be combined, wherein both linear and interleaved plans are generated and utilized by the planner component 102.

The planner component 102 can pull from a repository (not shown) of previously generated plans in certain embodiments. The planner component 102 is also capable of determining multiple configurations and generating a sequence of steps to solve the problems. Although the entity may or may not be involved with the solution to the problem, the entity can collaborate with the planner to review the steps thereafter. However, it should be noted that if the entity does not collaborate with the planner component 102, then the planner component 102 can solve the problem without intervention from the entity.

Furthermore, the collaboration component 100 can comprise the tracker component 104, which can be utilized to track data related to the planner, the entity, and/or the activity. The tracker component 104 can track the plan generated by the planner component 102 and what changes have occurred to the plan. Thus, contributions from various parties can be tracked as a function of the plan change from one domain model to another domain model. The tracker component 104 can track information such as: plan development by the planner component or the entity, what data is being stored, times associated with various activities, etc. For example, a plan can be generated by the planner component 102, the entity, and/or an environment. The tracker component 104 can then track who generated the plan. An activity associated with the plan can comprise plan generation, plan retrieval from the repository and reuse, heuristic calculations, etc. This information can then be used to calculate collaboration ratios and used to visualize the collaboration for an end user as discussed below.

It should also be noted that an AI component can facilitate automating one or more features in accordance with the disclosed aspects. A memory and a processor as well as other components can include functionality with regard to the figures. The disclosed aspects in connection with estimating and visualizing entity to agent collaboration to facilitate automated plan generation can employ various AI-based schemes that facilitate carrying out various aspects thereof. For example, a process for detecting one or more trigger events, calculating a contribution as a result of the one or more trigger events, and visualizing one or more contribution measurements, and so forth, can be facilitated with an example automatic classifier system and process. In another example, a process for penalizing a contribution from the entity while preferring another contribution from the planner component 102 (or vice versa) can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via generic training data) as well as implicitly trained (e.g., via observing the collaboration component 100 as it relates to the triggering events). For example, SVMs can be configured via a learning or training phase within a classifier constructor and feature selection module. Thus, the classifier(s) can be used to automatically learn and perform a number of functions, including but not limited to generating a plan, calculating one or more contributions, and so forth. The criteria can include, but is not limited to, predefined values, contribution attenuation tables or other parameters, preferences and/or policies, and so on.

Figure 2:
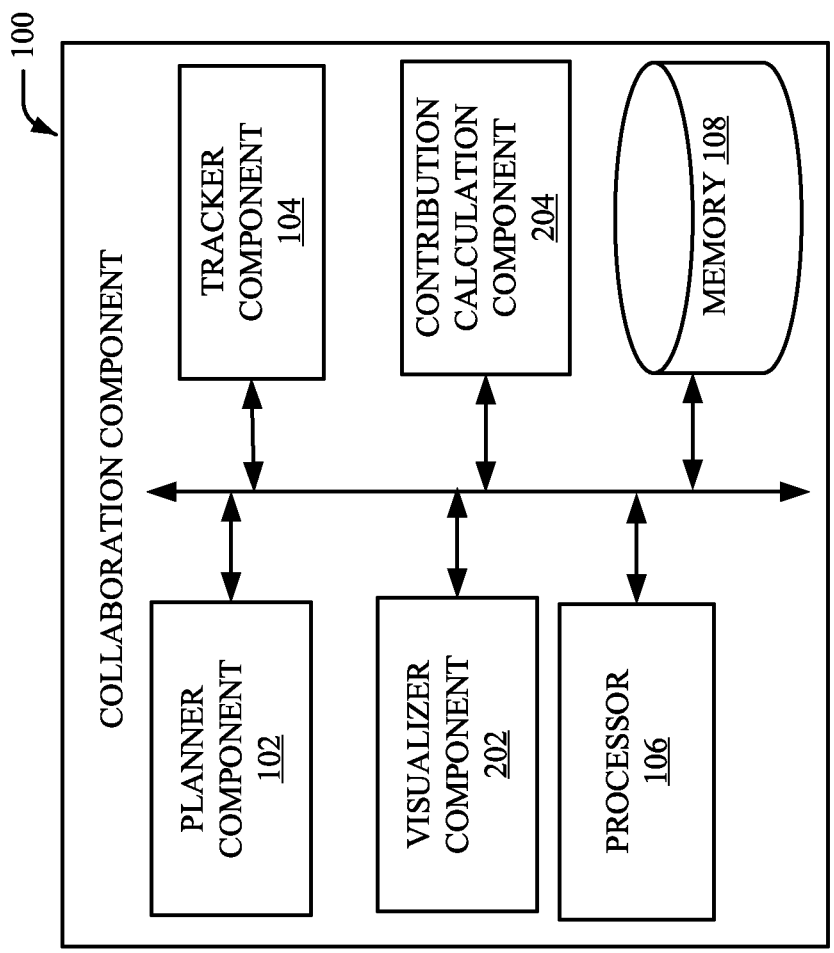
FIG. 2 illustrates a block diagram of an example, non-limiting collaboration component that facilitates estimating and visualizing collaboration to facilitate automated plan generation in accordance with one or more embodiments described herein.

FIG. 2 illustrates another block diagram of an example, non-limiting collaboration component that facilitates estimating and visualizing collaboration to facilitate automated plan generation in accordance with one or more embodiments described herein. Repetitive description of like elements employed in other embodiments described herein is omitted for sake of brevity.

In an alternative embodiment, the collaboration component 100 can comprise a contribution calculation component 204 and a visualizer component 202. It should be noted that the sub-components (e.g., contribution calculation component 204, visualizer component 202, etc.), processor 106, and memory 108 can bi-directionally communicate with each other. It should also be noted that in alternative embodiments that other components including, but not limited to the sub-components, processor 106, and/or memory 108, can be external to the collaboration component 100.

The contribution calculation component 204 can be configured to calculate a contribution of the entity and the agent based on their respective contributions to developing a plan. For example, the entity's contributions can be calculated based on a ratio of plan generation from the entity to the overall plan generation. Changes to various plans can be performed by either the entity or the agent. These changes can be measured by the contribution calculation component 204. The measured changes can reflect what impact the entity had on the plan, and/or what impact the agent had on the plan. For example, if the contribution calculation component has determined that the entity contributed 75% to a plan modification, and the objective of the end-user is to reduce the entities' (e.g., knowledge engineer) contribution, then the planner component 102 can be reconfigured. The planner component 102 can be reconfigured by changing a search parameter associated with the planner component 102, or changing heuristic guidance function that estimates cost to reach a goal state. The entity can manually modify the plan to account for data left out of the domain model and increase its contribution.

Additionally, contributions can be calculated by defining branch points. For example, the domain model can be modified by adding actions, removing actions, and/or modifying actions (e.g., modify costs, modify preconditions, add/remove effects). An action is applicable in a state if a precondition is satisfied in the state, and an action sequence (e.g., a plan) is a solution to the problem if the action sequence can be executed from an initial state, and the resulting state corresponds to a goal state. The planner component 102 configuration can be modified by changing a search method (e.g., changing a weighting parameter for weighted A*), changing a heuristic function, and/or adding/removing a pruning method (e.g., turning off symmetry reduction, turning off partial order reduction, etc.). Alternatively, the plan can be manually modified (e.g., action reordering, replacing action subsequences, etc.).

Additionally, the contribution calculation component 204 can perform a quantitative and/or qualitative analysis on the plan modifications. During a quantitative analysis, points can be awarded for different impacts to the plan based on the entity or the planner. For example, with regards to a search space size, once a heuristic is changed from H1 to H2, the difference in the change that is estimated by the search function can be determined. Thus, that difference (e.g., score, value, etc.) can be attributed as a value to either the entity or the planner. Alternatively, a qualitative analysis can comprise score ratings of low, medium, and/or high impact. For example, if the entity and the planner component 102 provide equal contributions to the plan, and then a new action by the entity has been determined to have increased its contribution, then the entity can be rated with a high impact score. It should be noted that the quantitative score ratings can also be predefined. For example, a low impact score can correspond to anything less than a 30% shift change, a medium impact score can correspond to between a 31%-70% shift change, and a high impact score can correspond to between a 71%-100% shift change. Values and analysis generated by the contribution calculation component can then be sent to the visualizer component 202 for display.

The visualizer component 202 can utilize a planning domain definition language (PDDL) to capture a plan representation, causality, intent, and sources. The PDDL can be used to describe object properties of a problem and the actions describing changes to the object properties (e.g., object properties required to apply the action, changes in the object properties as a result of action application, cost of action application, etc.). An object can be represented by terms (e.g., constants or variables) in a domain, and a predicate is a logical construct that refers to the relationship between objects in the domain. The basic plan information the visualizer component 202 can display are sequences of actions, actors, plan costs, the sum of individual action costs, probabilities etc. The graphical representation can uniquely show contributions of actors and their change over time.

Figure 3:
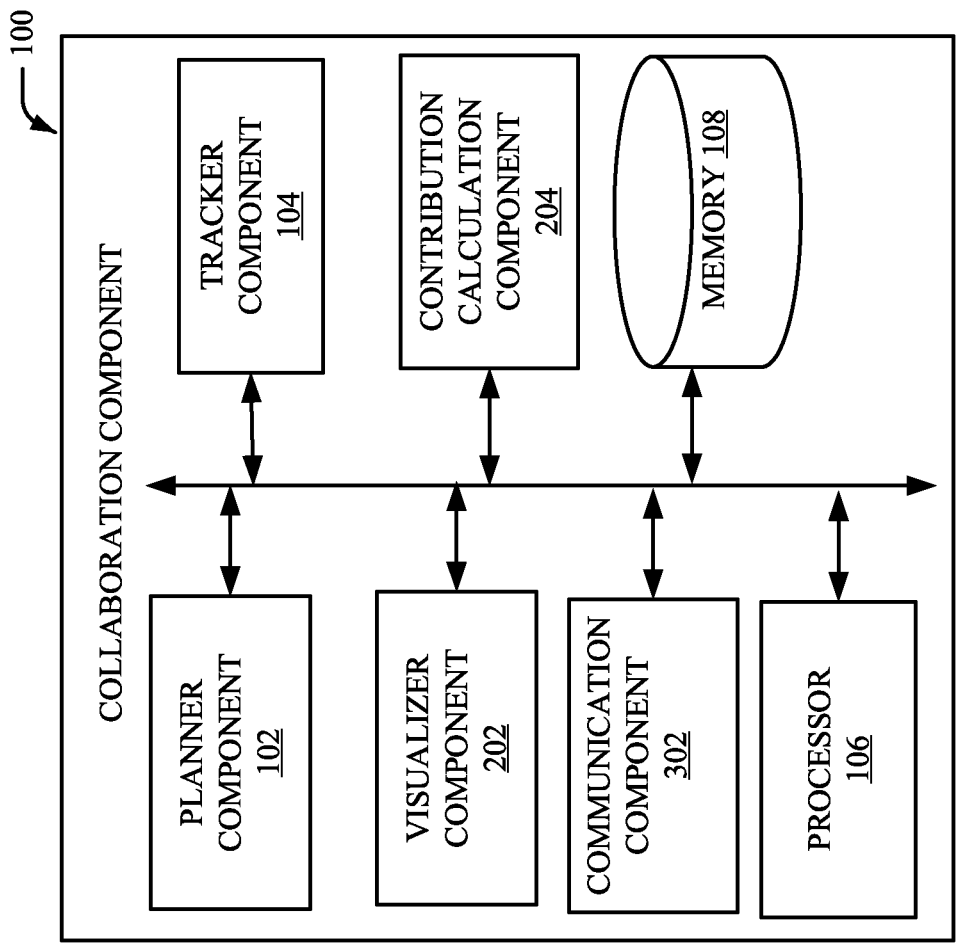
FIG. 3 illustrates a block diagram of an example, non-limiting collaboration component that facilitates estimating and visualizing collaboration to facilitate automated plan generation in accordance with one or more embodiments described herein.

FIG. 3 illustrates yet another block diagram of an example, non-limiting collaboration component that facilitates estimating and visualizing collaboration to facilitate automated plan generation in accordance with one or more embodiments described herein. Repetitive description of like elements employed in other embodiments described herein is omitted for sake of brevity.

In an alternative embodiment, the collaboration component 100 can comprise a communication component 302. It should be noted that the sub-components, processor 106, and memory 108 can bi-directionally communicate with each other. It should also be noted that in alternative embodiments that other components including, but not limited to the sub-components, processor 106, and/or memory 108, can be external to the collaboration component 100.

The communication component 302 can be operative to receive various inputs. For example, the communication component 302 can receive domain model data representative of the domain model from the entity, predetermined plans stored in plan repository, problems, and/or entity verification and authentication data. Additionally, the communication component 302 can be operative to send output data to an end user of the system. The output data can comprise plans, a sequence of actions and/or steps with time stamps, and the graphical representations as described in relation to the visualizer component 202.

Figure 4:
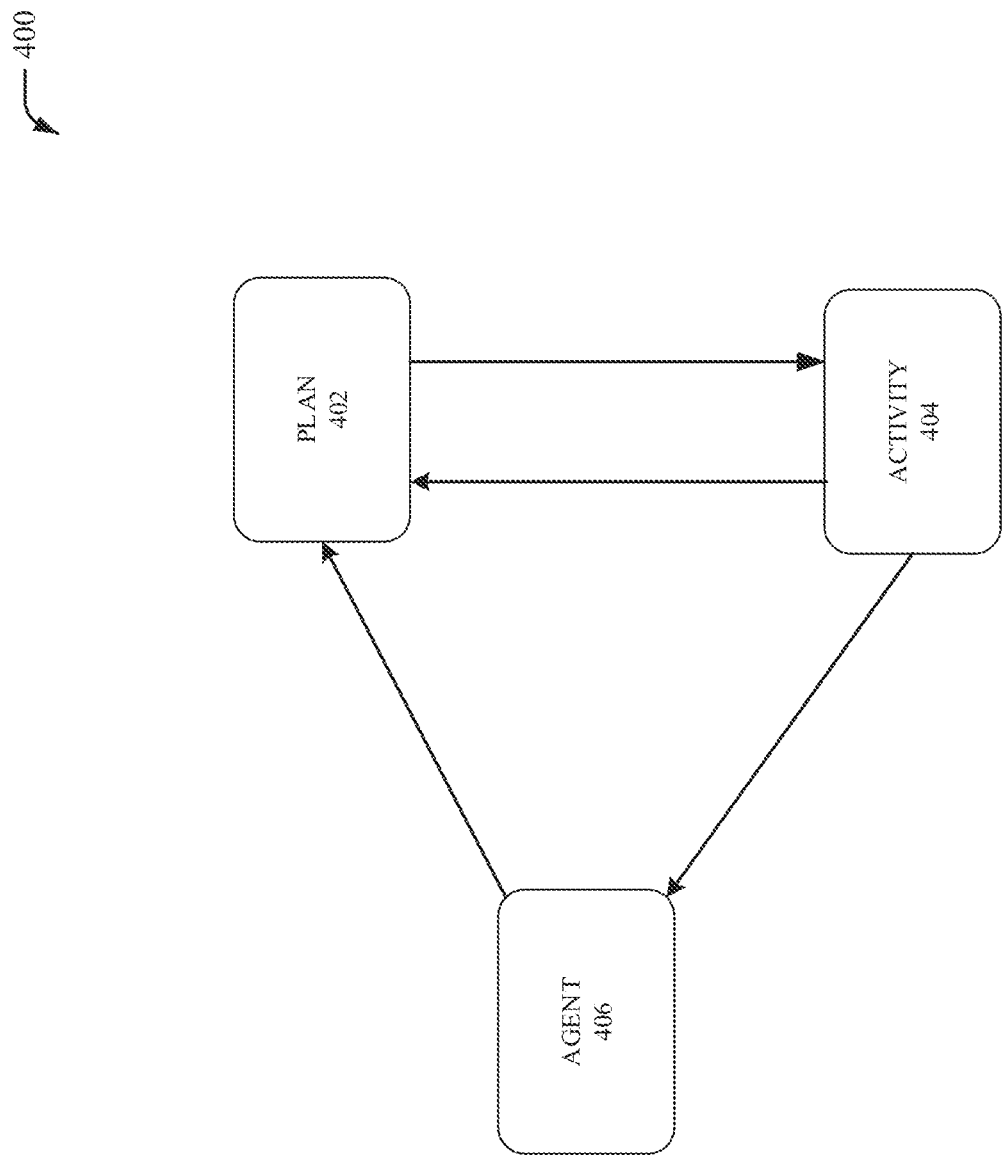
FIG. 4 illustrates an additional block diagram of an example, non-limiting collaboration provenance chain in accordance with one or more embodiments described herein.

FIG. 4 illustrates an additional block diagram of an example, non-limiting plan tracking process in accordance with one or more embodiments described herein. Repetitive description of like elements employed in other embodiments described herein is omitted for sake of brevity.

The tracker component 104 can use a standard plan representation ontology to track information about what component is taking what action, what data is stored, and what activity is occurring at a specific time. For example, FIG. 4 depicts an agent block 406 that can act on behalf of the planner component 102, entity, or environment to change plans. The plan block 402 can represent what gets modified, and the activity block 404 can be informed by plan generation, plan retrieval from a repository, heuristic input, plan modification, etc. It should be noted that the activity can be time-stamped with beginning and/or ending times.

Thus, the plan block 402 can be modified by the agent block 406 and/or the plan block 402 can be modified based on the activity block 404 executed. For example, if the activity comprised a plan modification, then the plan block 402 can be modified in accordance with the plan modification. Conversely, if the entity contributed less to developing the plan at the plan block 402, then the plan can be modified later with an increased contribution from the entity and a reduced contribution from the planner component 102 if the reduced contribution from the planner component 102 achieves the goal (e.g., final state) in less steps.

The plan block 402 can also be communicated to the activity block 404 to be operated on by the activity block 404. For example, an original plan can be sent from the plan block 402 to the activity block 404. Consequently, as the precursor to a modification, the original plan can be modified at the activity block 404 prior to being sent back to the plan block 402 as an updated plan. Additionally, the updated plan can also be sent from the activity block 404 to the agent block 406, wherein the agent can modify the plan again or generate a new plan to be sent to the plan block 402 as the new updated plan.

Figure 5:
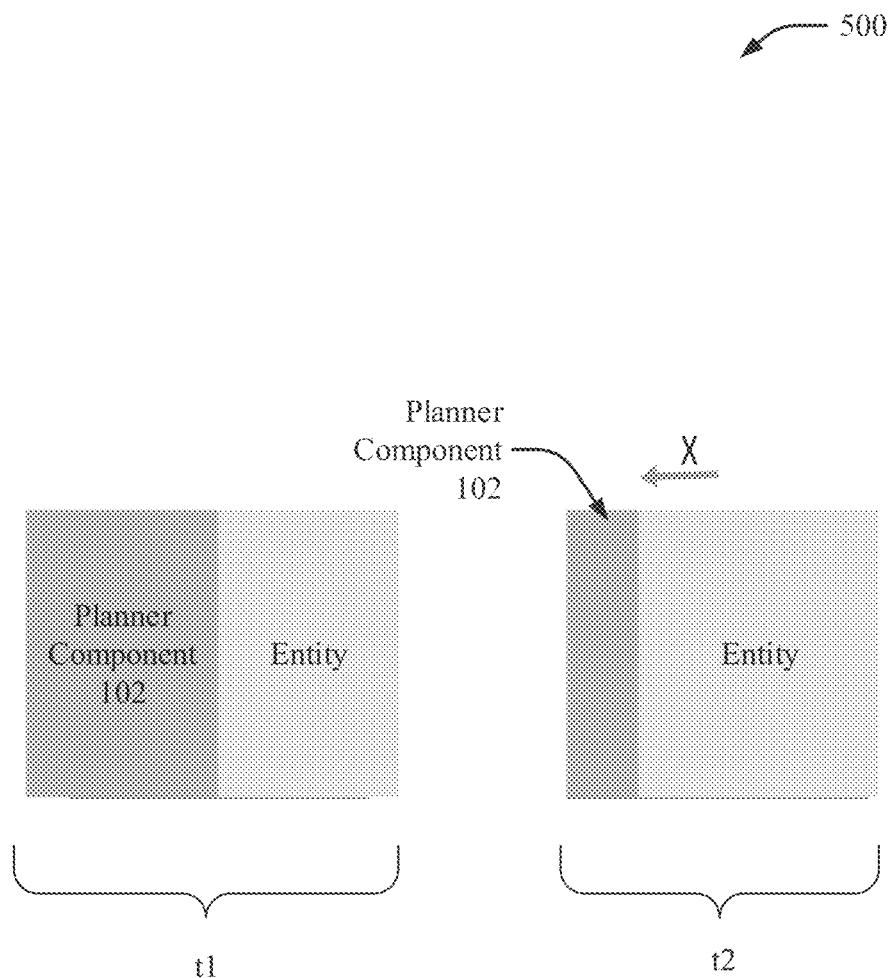
FIG. 5 illustrates an additional block diagram of example, non-limiting collaboration shift in accordance with one or more embodiments described herein.

FIG. 5 illustrates an additional block diagram of example, non-limiting collaboration shift in accordance with one or more embodiments described herein. Repetitive description of like elements employed in other embodiments described herein is omitted for sake of brevity.

FIG. 5 depicts a representation of planning contributions 500 from an entity and the planner component 102 at times t1 and t2. In an example embodiment, at time t1, the planner component 102 and the entity can both contribute to a plan roughly 50%. However, the planner component 102 and the entity's contributions can change over the course of time. Thus, at time t2, the entity is shown to be contributing roughly 75% to the plan while the planner component 102 is contributing only roughly 25% to the plan. It should be noted that any percent contribution breakdown is possible. For instance in some embodiments, the planner component can contribute 0% and the entity can contribute 100%.

As discussed previously, the contributions from the planner component 102 and/or the entity can be modified in accordance with several system factors. Some of the system factors can depend on the environment within which the collaboration component 100 is operating. Other factors can depend on the efficacy of the plan itself. For example, if the entity provides more of the plan contribution, it can be determined that the plan is becoming more efficient (e.g., facilitating less steps to reach the final goal, increasing plan quality, reduced time of plan execution, etc.), or the plan is becoming less efficient (e.g., increasing the number of steps to reach the goal, increased time of plan execution, decreasing plan quality). If the plan is becoming less efficient, then the entity's contribution to the plan can be decreased to allow the planner component to contribute more to the plan with the goal of increasing efficiency. Conversely, if the entity's increased plan contribution had been determined to reduce the number of steps to achieve a particular goal, then the entity's contribution can continue to be increased to generate additional efficiencies within the system for future iterations.

In some embodiments, optimal efficiencies can prevent an entity or the planner component 102 from increasing or decreasing their contribution. For example, although an increase in the entity's contribution from 50% at t1 to 75% at t2 can be determined to increase efficiencies, any additional contribution from the entity, which will prompt a lower contribution from the planner component 102, can possibly decrease the efficiency of the overall system. The aforementioned analysis can assist in determining where additional resources should be allocated in relation to the entity and/or the planner component 102.

Figure 6:
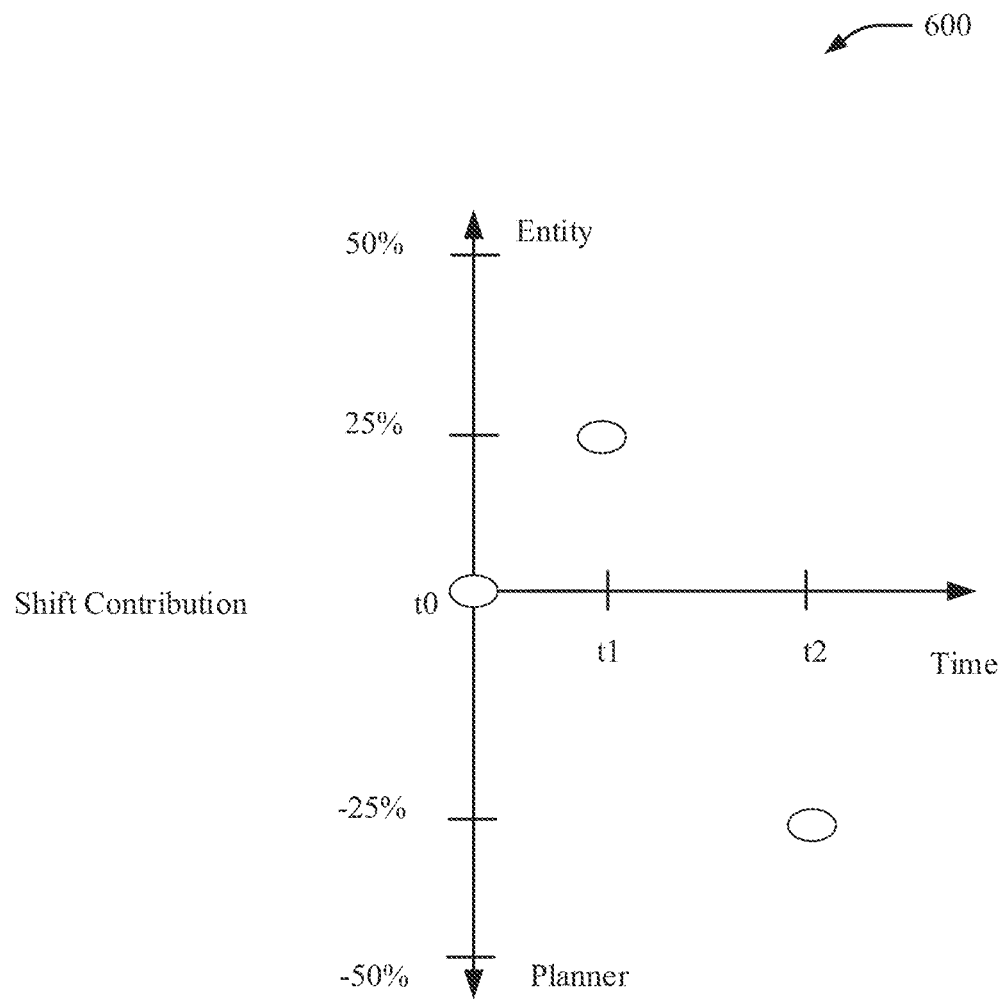
FIG. 6 illustrates a graph of an example, non-limiting collaboration shift in accordance with one or more embodiments described herein.

FIG. 6 illustrates a graph of an example, non-limiting collaboration shift in accordance with one or more embodiments described herein. Repetitive description of like elements employed in other embodiments described herein is omitted for sake of brevity.

In one embodiment, the shift contribution graph 600 depicts the planner to entity contributions as a function of time. As depicted, at time t0, the entity and the planner component 102 can begin with equal contributions to the plan. However, based on some predefined factor, learning, or training associated with the contribution calculation component 204, the entity can shift to provide an additional 25% to the plan contribution, causing a decrease in the planner component's 102 contribution.

Alternatively, based on some predefined factor, learning, or training associated with the contribution calculation component 204, at t2, the planner component 102 can shift to provide an additional 25% to the plan contribution causing a decrease in the entity's plan contribution. In either case, the shifts by the entity or the planner component 102 can occur independently of the other. For example, an increase in the entity's contribution can automatically lower the contribution of the planner component 102. However, in other embodiments, an increase in the entity's contribution may not automatically lower the contribution of the planner component 102. It should also be noted that one or more planner components (e.g., planner component 102) can be used within one or more collaboration components (e.g., collaboration component 100) to determine the most efficient planner component based on specific scenarios and contribution information. Additionally, rules associated with the domain models can generate single plans or multiple plans depending on which is more efficient (e.g., reduces steps to the final goal).

Figure 7:
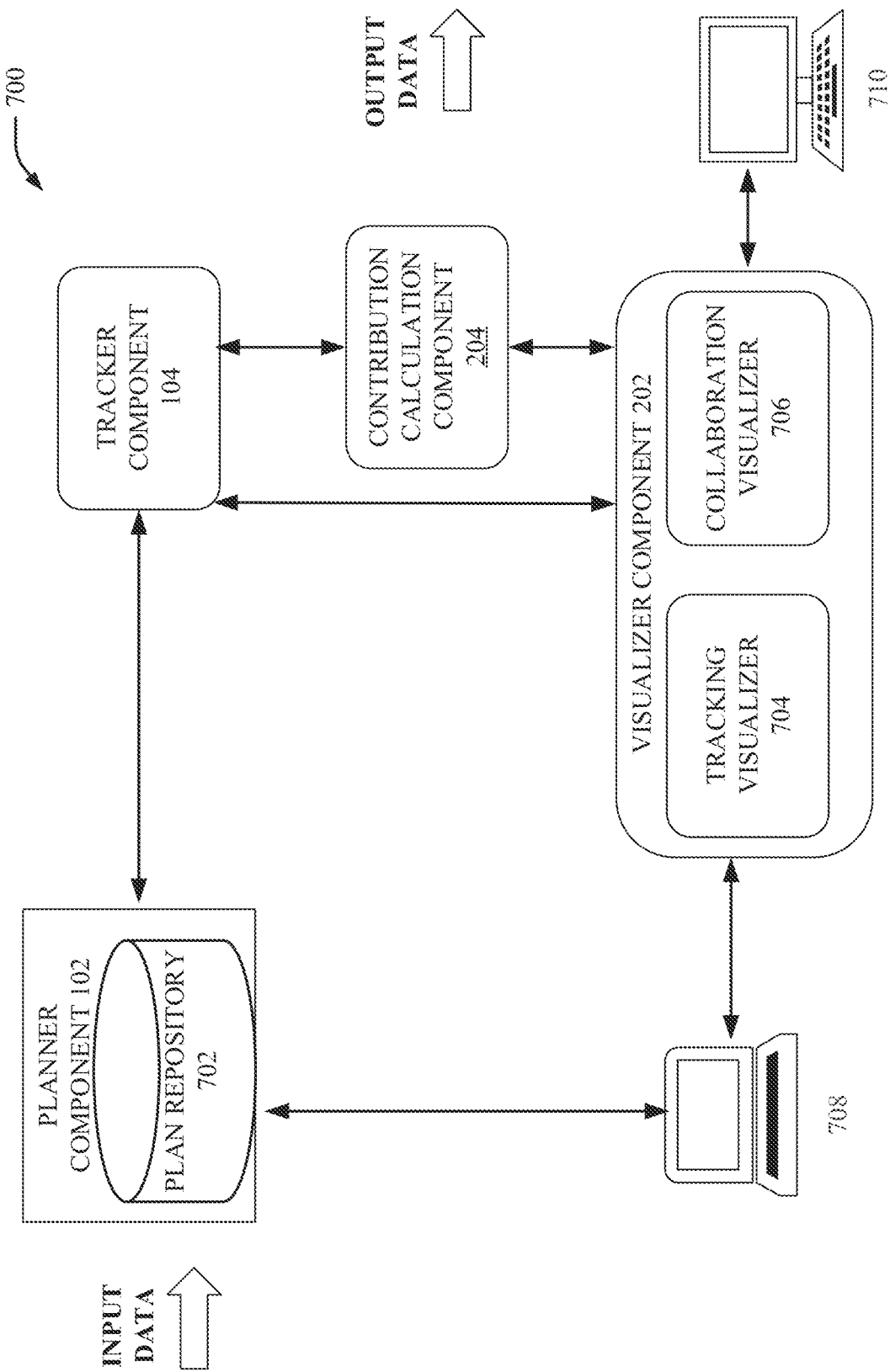
FIG. 7 illustrates an additional block diagram of another example, non-limiting system architecture that facilitates estimating and visualizing collaboration to facilitate automated plan generation in accordance with one or more embodiments described herein.

FIG. 7 illustrates a flow diagram of another example, non-limiting system architecture for facilitating estimating and visualizing collaboration to facilitate automated plan generation in accordance with one or more embodiments described herein. Repetitive description of like elements employed in other embodiments described herein is omitted for sake of brevity.

The system 700 architecture can comprise the planner component 102, the tracker component 104, the contribution calculation component 204, the visualizer component 202, and several endpoint devices 708, 710. It should also be noted that the planner component 102 can comprise a plan repository 702 and the visualizer component 202 can comprise a tracking visualizer 704 and a collaboration visualizer 706. Input data comprising a domain and/or a problem associated with the domain can be received by the planner component 102. The planner component 102 can also be operable to communicate with the entity via an endpoint device 708. For example, the planner component 102 can receive plan contribution data from the entity and confirm receipt of the plan contribution data to the entity. The planner component 102 can attempt to solve the problem by generating a new plan, allocating a plan from the plan repository 702, and/or utilizing a plan from the entity.

Additionally, the tracker component 104 can track whether the planner component 102 generated the plan, whether the plan was extracted from the plan repository 702, and/or whether the plan was generated by the entity and sent from the endpoint device 708. Furthermore, the tracker component 104 can determine whether the plan has affected an activity associated with reaching an end goal, wherein the activity can be plan generation, plan retrieval, heuristic calculations, etc.

Based on tracking data received from the tracker component 104, the contribution calculation component 204 can determine the contribution of the planner component 102 and/or the entity to the plan. For example, was most of the plan utilized to achieve the goal developed by the entity or the planner component 102? Alternatively, was the plan retrieved from the plan repository 702 or was the plan generated by the planner component 102. Depending upon the answers to the aforementioned questions, the system 700 can be iteratively modified to adjust the plan contributions from the entity and/or the planner component 102. An evaluation function can determine a number of specific steps of a plan to achieve an end state, wherein different actions have different associated costs. Therefore, the advantage of knowing the contribution of the entity to the plan allows the entity to determine when to defer to the planner component 102 to increase workflow efficiency. Additionally, knowing the contribution of the entity to the plan allows the entity to determine where to invest or reduce resources.

In an additional embodiment, the visualizer component 202 can comprise the tracking visualizer 704 and the collaboration visualizer 706. Because the visualizer component 202 can comprise a display screen operable to display characteristics of the system 700, both tracking data and collaboration data, received from the tracker component 104 and the contribution calculation component 204, respectively, can be displayed via the visualizer component 202. It should be noted that in other embodiments, the tracking visualizer 704 and the collaboration visualizer 706 can be external to the visualizer component 202.

The tracking visualizer 704 can be operable to display graphical and data-based representations of the data generated by the tracker component 104. For instance, the tracking visualizer component can pictorially display what agent (e.g., the planner component 102, the entity, etc.) acted on the plan. The display can be seen by the entity at the endpoint device 708 and/or an end user at another endpoint device 710. Additionally, the contribution calculation component 204 can send data to the visualizer component 202. The collaboration visualizer 706 can then generate graphical and/or pictorial data (e.g., FIG. 5, FIG. 6) to be displayed by the collaboration visualizer 706. Furthermore, the display can be seen by the entity at the endpoint device 708 and/or an end user at another endpoint device 710.

Figure 8:
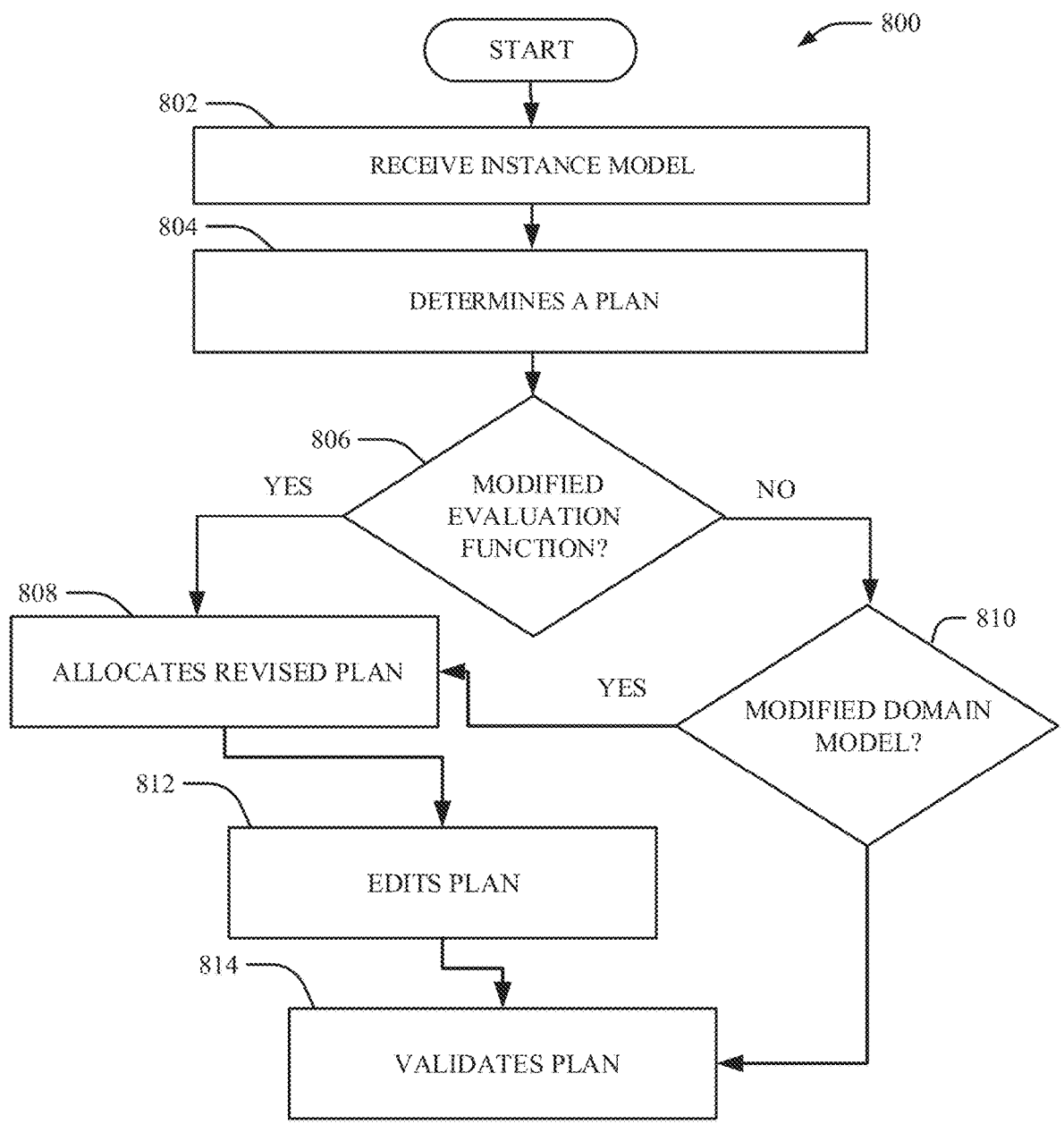
FIG. 8 illustrates a flow diagram of an example, non-limiting system that facilitates estimating and visualizing collaboration to facilitate automated plan generation in accordance with one or more embodiments described herein.

FIG. 8 illustrates a flow diagram of an example, non-limiting system that facilitates estimating and visualizing collaboration to facilitate automated plan generation in accordance with one or more embodiments described herein. Repetitive description of like elements employed in other embodiments described herein is omitted for sake of brevity.

The flow diagram 800 can comprise receiving domain and problem model data at block 802. The planner component 102 can determine a plan based on receiving the domain and problem model. Consequently, a determination as to whether an evaluation function (e.g., the number of steps in a plan) has been modified can be determined at block 808. If the evaluation function has not been determined to have been modified, then a determination as to whether the domain model has been modified can be made at block 810. If the domain model has been determined to have not been modified, then the planner can validate the plan at block 814. However, if the domain model has been determined to have been modified at block 810, or the evaluation function has been determined to have been modified at block 806, then the planner component 102 can allocate a revised plan to the problem at block 808. After the planner component 102 has allocated the revised plan to the problem at block 808, then the system can edit the plan at block 812 and the planner component 102 can validate the plan at block 814.

Figure 9:
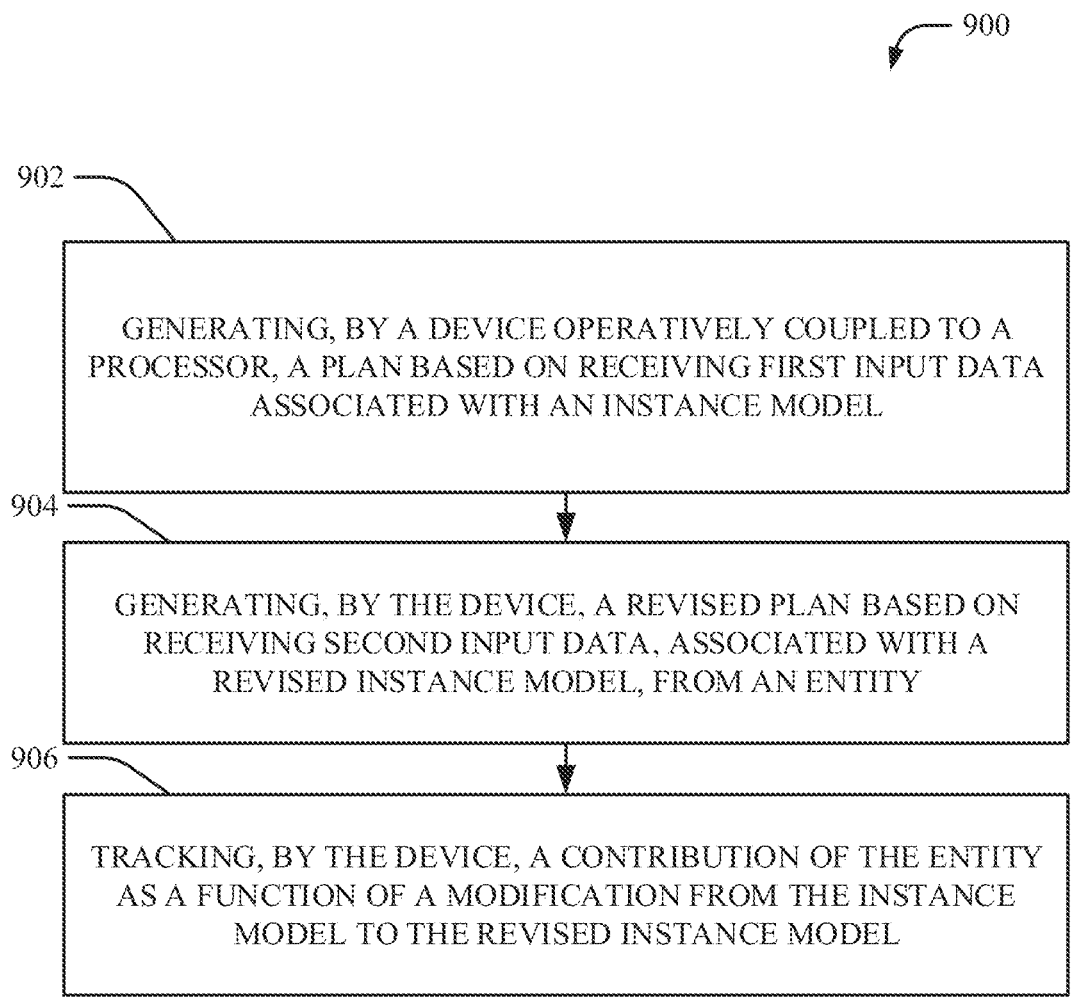
FIG. 9 illustrates a flow diagram of another example, non-limiting computer-implemented method that facilitates estimating and visualizing collaboration to facilitate automated plan generation in accordance with one or more embodiments described herein.

FIG. 9 illustrates a flow diagram of another example, non-limiting computer-implemented method 900 that facilitates estimating and visualizing collaboration to facilitate automated plan generation in accordance with one or more embodiments described herein. Repetitive description of like elements employed in other embodiments described herein is omitted for sake of brevity.

At element 902, the method 900 can comprise generating (e.g., the planner component 102), by a device operatively coupled to a processor, a plan based on receiving (e.g., via the communication component 302) first input data associated with an instance model. Additionally, at element 904, the method can further comprise generating (e.g., the planner component 102), by the device, a revised plan based on receiving (e.g., via the communication component 302) second input data, associated with a revised instance model, from an entity. Furthermore, at element 906, the method can comprise tracking (e.g., via the tracker component 104), by the device, a contribution of the entity as a function of a modification from the instance model to the revised instance model.

Figure 10:
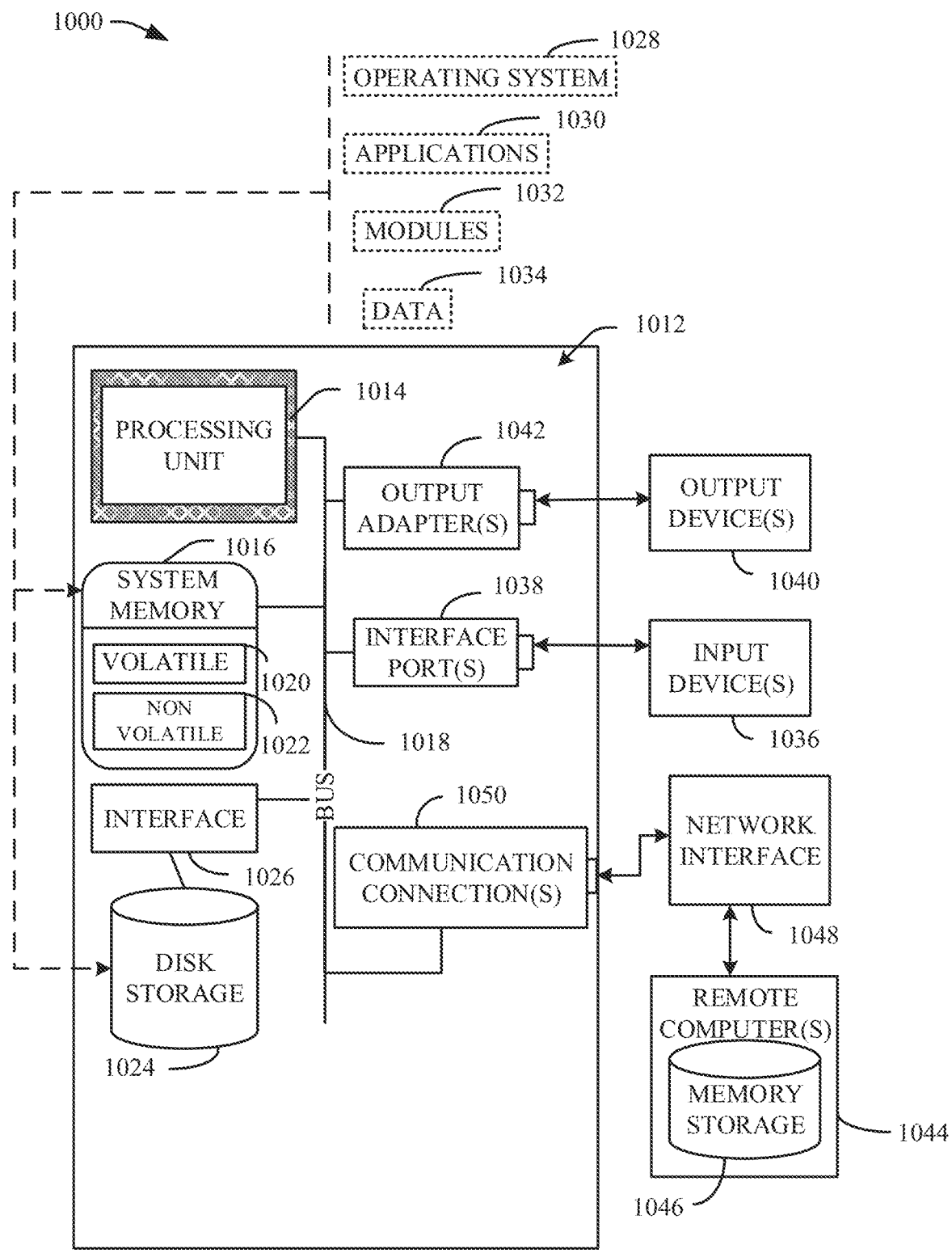
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a general description of a suitable environment in which the various aspects of the disclosed subject matter can be implemented. FIG. 10 illustrates a block diagram of an example, non-limiting operating environment in which one or more embodiments described herein can be facilitated. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a planner component that:
employs a classification approach to evaluate utilities, wherein the classification approach locates a hypersurface in a space of possible inputs to isolate a trigger event;
generates a plan based on receiving first input data associated with an instance model, based on the planner component solving one or more problems in a domain, wherein the first input data is a first planning language or a second planning language, wherein the first planning language accepts a single model, and wherein the second planning language accepts a planning domain definition language; and
iteratively:
generates a revised plan based on receiving second input data, associated with a revised instance model, from an entity, wherein the second input data is the first planning language or the second planning language;
and
a tracker component that:
tracks a respective contribution of the entity and the planner component as a function of modifications from the instance model to the revised instance model.

2. The system of claim 1, wherein the first input data comprises problem model data associated with a problem model and domain model data associated with a domain model.

3. The system of claim 2, wherein the computer executable components further comprise a visualizer component that generates property data representative of an object property associated with the problem model.

4. The system of claim 2, wherein the computer executable components further comprise a contribution calculation component that estimates a contribution of the entity based on a difference in a change between the instance model and the revised instance model.

5. The system of claim 4, wherein the change is associated with a modification to an action received from the entity.

6. The system of claim 1, wherein the computer executable components further comprise a visualizer component that displays a user interface comprising contribution data representative of the respective contributions of the entity and the planner component over time.

7. The system of claim 2, wherein the computer executable components further comprise a communication component that receives the domain model data representative of the domain model from the entity.

8. A computer program product that facilitates automated plan generation, the computer program product comprising a computer readable storage medium having program instructions embodied therewith, the program instructions executable by a processor to cause the processor to:
employ, via a planner component, a classification approach to evaluate utilities, wherein the classification approach locates a hypersurface in a space of possible inputs to isolate a trigger event;

generate, via the planner component a plan based on receiving first input data associated with an instance model, based on the planner component solving one or more problems in a domain, wherein the first input data is a first planning language or a second planning language, wherein the first planning language accepts a single model, and wherein the second planning language accepts a planning domain definition language; and iteratively:
generate, via the planner component a revised plan based on receiving second input data, associated with a revised instance model, from an entity, wherein the second input data is the first planning language or the second planning language, and track respective contribution of the entity and the planner component as a function of modifications from the instance model to the revised instance model.

9. The computer program product of claim 8, wherein the first input data comprises problem model data associated with a problem model and domain model data associated with a domain model.

10. The computer program product of claim 9, wherein the program instructions are further executable by the processor to cause the processor to:
generate property data representative of an object property associated with the problem model.

11. The computer program product of claim 9, wherein the program instructions are further executable by the processor to cause the processor to:
estimate a contribution of the entity based on a difference in a change between the instance model and the revised instance model.

12. The computer program product of claim 11, wherein the change is associated with a modification to an action received from the entity.

13. The computer program product of claim 8, wherein the program instructions are further executable by the processor to cause the processor to:
display a user interface comprising contribution data representative of the respective contributions of the entity and the planner component over time.

14. The computer program product of claim 9, wherein the program instructions are further executable by the processor to cause the processor to:
receive the domain model data representative of the domain model from the entity.

15. A computer-implemented method, comprising:
employing, by a device operatively coupled to a processor, via a planner component, a classification approach to evaluate utilities, wherein the classification approach locates a hypersurface in a space of possible inputs to isolate a trigger event;

generating, by the device, via the planner component a plan based on receiving first input data associated with an instance model, based on the planner component solving one or more problems in a domain, wherein the first input data is a first planning language or a second planning language, wherein the first planning language accepts a single model, and wherein the second planning language accepts a planning domain definition language;

iteratively:
generating, by the device, via the planner component a revised plan based on receiving second input data, associated with a revised instance model, from an entity, wherein the second input data is the first planning language or the second planning language, and tracking, by the device, a contribution of the entity as a function of a modification from the instance model to the revised instance model.

16. The computer-implemented method of claim 15, wherein the first input data comprises problem model data associated with a problem model and domain model data associated with a domain model.

17. The computer-implemented method of claim 16, further comprising:
generating, by the device, property data representative of an object property associated with the problem model.

18. The computer-implemented method of claim 16, further comprising:
estimating, by the device, a contribution of the entity based on a difference in a change between the instance model and the revised instance model.

19. The computer-implemented method of claim 18, wherein the change is associated with the modification to an action received from the entity.

20. The computer-implemented method of claim 18, further comprising:
displaying, by the device, a user interface comprising contribution data representative of the respective contributions of the entity and the planner component over time.

* * * * *